(12) United States Patent
Yamaguchi

(10) Patent No.: US 12,552,400 B2
(45) Date of Patent: Feb. 17, 2026

(54) VEHICLE INFORMATION RECORDING SYSTEM

(71) Applicant: TOYOTA JIDOSHA KABUSHIKI KAISHA, Toyota (JP)

(72) Inventor: Yohsuke Yamaguchi, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/915,370

(22) Filed: Oct. 15, 2024

(65) Prior Publication Data

US 2025/0229792 A1 Jul. 17, 2025

(30) Foreign Application Priority Data

Jan. 11, 2024 (JP) ................. 2024-002655

(51) Int. Cl.
*H04N 7/18* (2006.01)
*B60K 35/10* (2024.01)
*B60W 50/08* (2020.01)

(52) U.S. Cl.
CPC ............ *B60W 50/08* (2013.01); *B60K 35/10* (2024.01); *B60K 2360/21* (2024.01); *B60W 2554/80* (2020.02)

(58) Field of Classification Search
CPC .... H04N 7/18; B60W 50/08; B60W 2554/80; B60K 35/10; B60K 2360/21
USPC ......................................................... 348/148
See application file for complete search history.

(56) References Cited

U.S. PATENT DOCUMENTS

| | | | |
|---|---|---|---|
| 9,969,261 B2 | 5/2018 | Kodama | |
| 10,045,173 B1 | 8/2018 | Morimura et al. | |
| 10,106,157 B2 | 10/2018 | Sawada et al. | |
| 10,150,407 B2 | 12/2018 | Takahashi et al. | |
| 10,696,297 B2 | 6/2020 | Nguyen Van et al. | |
| 11,001,255 B2 | 5/2021 | Fukuman et al. | |
| 11,110,937 B2 | 9/2021 | Kinoshita et al. | |
| 11,511,735 B2* | 11/2022 | Yukawa ................ | B60W 30/09 |
| 12,142,057 B2* | 11/2024 | Tamanaha ............. | G06V 20/58 |
| 2019/0001968 A1 | 1/2019 | Yorifuji et al. | |
| 2019/0344828 A1 | 11/2019 | Omori et al. | |
| 2019/0389488 A1 | 12/2019 | Yamada et al. | |
| 2025/0119513 A1* | 4/2025 | Jeong .................... | G06V 20/44 |

FOREIGN PATENT DOCUMENTS

| | | |
|---|---|---|
| JP | 2021-176107 A | 11/2021 |
| JP | 2022-043784 A | 3/2022 |

* cited by examiner

*Primary Examiner* — Trang U Tran
(74) *Attorney, Agent, or Firm* — SoraIP, Inc.

(57) ABSTRACT

The processor of ECU includes: a distance determination unit that determines a distance between the vehicle and an object existing in the vicinity of the vehicle; an operation determination unit that determines whether or not an operation by a driver of the vehicle has been performed on an operation device for driving the vehicle; and a recording unit that records information related to driving of the vehicle.

16 Claims, 4 Drawing Sheets

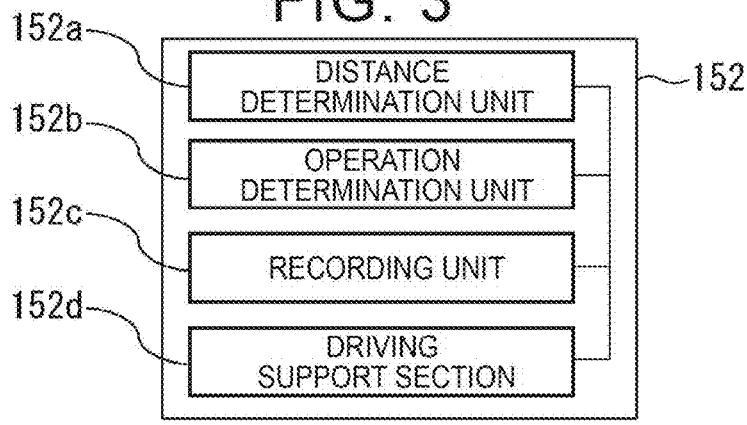
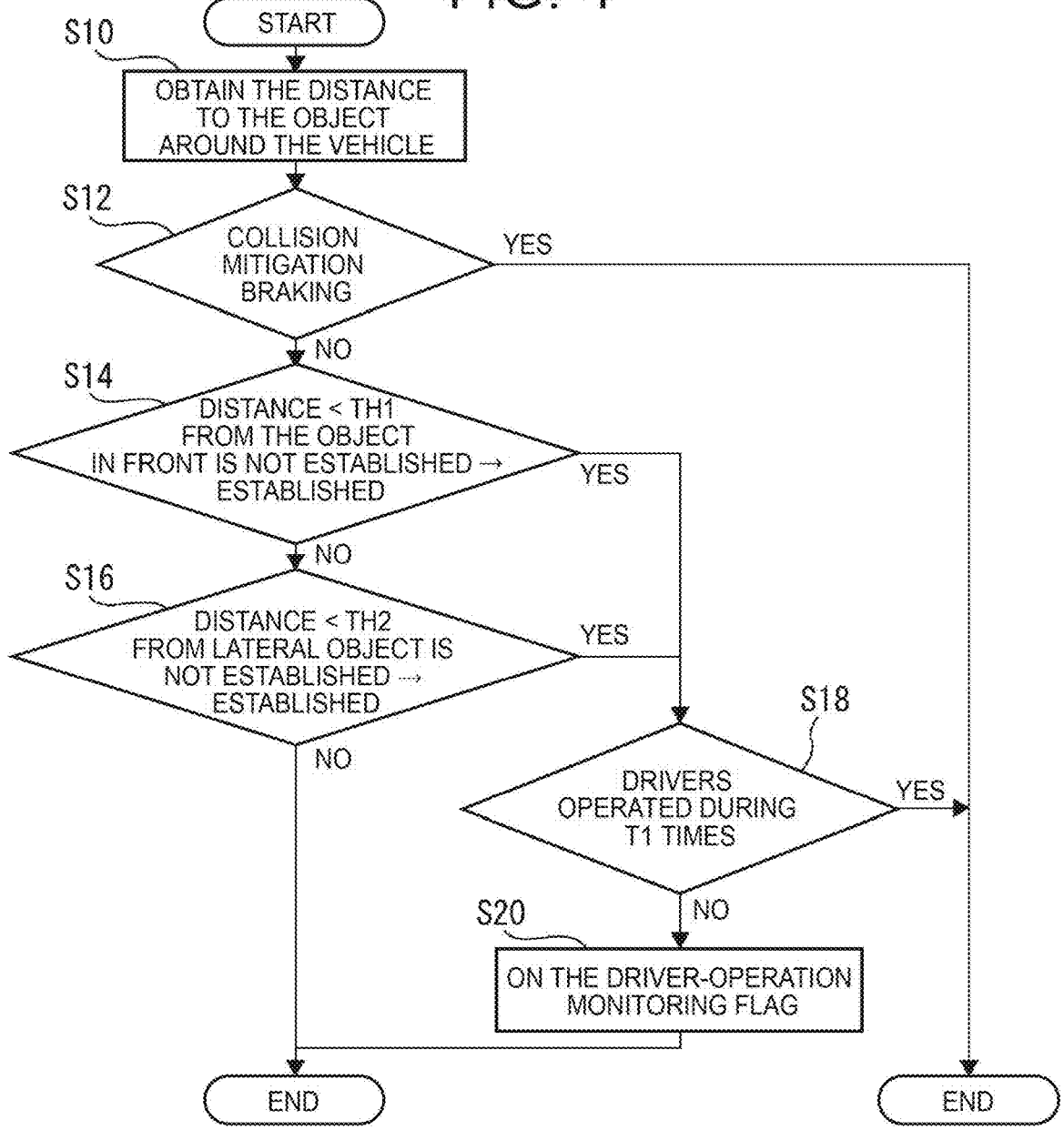

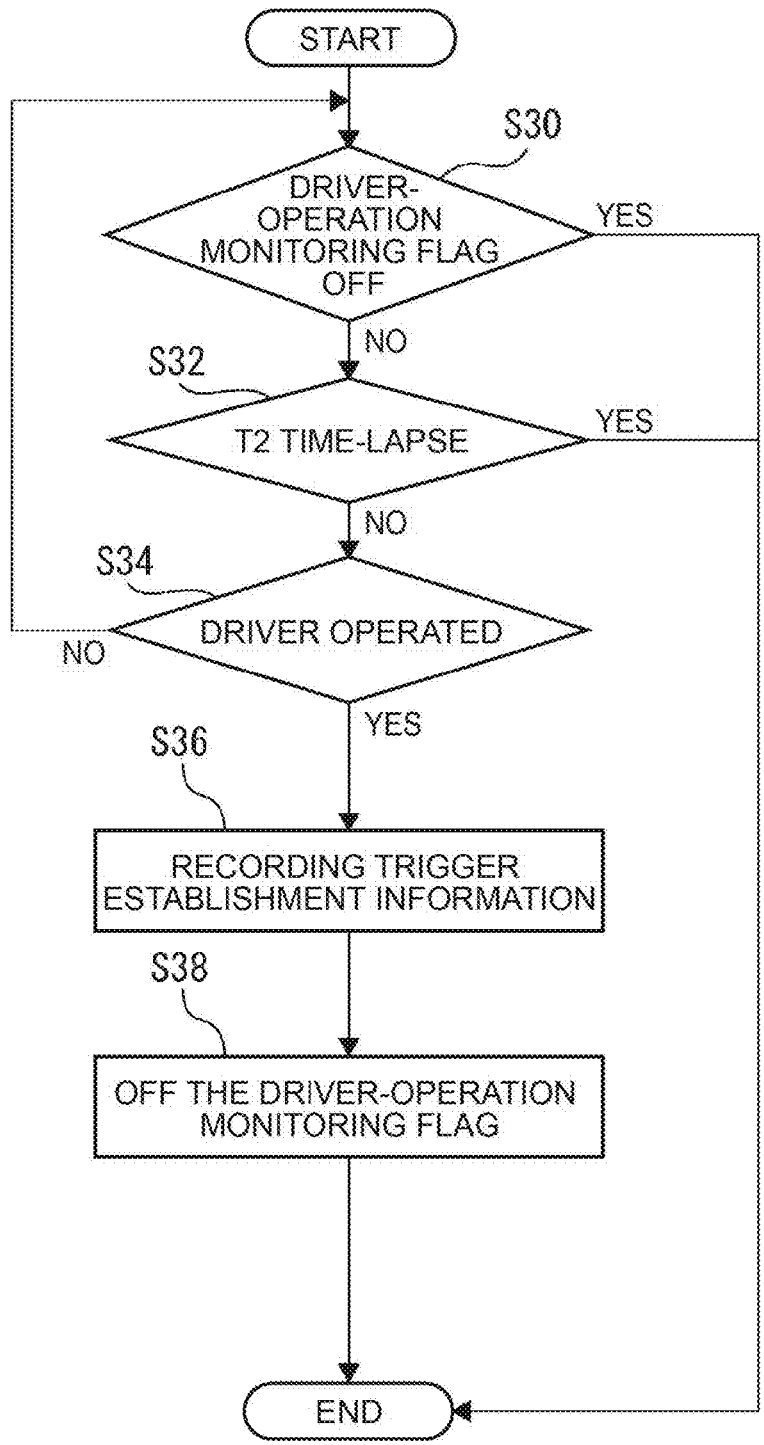

VEHICLE INFORMATION RECORDING SYSTEM

CROSS-REFERENCE TO RELATED APPLICATION

This application claims priority to Japanese Patent Application No. 2024-002655 filed on Jan. 11, 2024, incorporated herein by reference in its entirety.

BACKGROUND

1. Technical Field

The present disclosure relates to a vehicle information recording device.

2. Description of Related Art

Hitherto, it is known to acquire a vehicle surrounding situation, detect dangerous driving of another vehicle, and record an image of the vehicle surrounding (see Japanese Unexamined Patent Application Publication No. 2022-43784 (JP 2022-43784 A)).

SUMMARY

Recording of vehicle data in the event of an accident is useful for analyzing vehicle control and driver operations in the event of the accident. Along with the spread of advanced safety systems for vehicles in the future, it is assumed that information on vehicle driving is recorded and analyzed in a situation in which an accident does not actually occur but the driver is tensed (the driver feels some danger).

In the technology described in JP 2022-43784 A, event recording is performed when determination is made that the driving is not road rage driving based on a situation around a target vehicle acquired by a drive recorder of the target vehicle. Assuming that recording is performed for the situation in which the driver is tensed, recording is performed even when the driver intends to approach an object if the recording is performed based on approach between the vehicle and an object such as another vehicle. Thus, there is a problem that unnecessary data is recorded and accumulated.

Therefore, an object of the present disclosure is to provide a vehicle information recording device capable of recording a situation in which a driver of a vehicle feels some danger except for a situation intended by the driver.

The gist of the present disclosure is as follows.

(1) A vehicle information recording device includes:
- a distance determination unit configured to determine a distance between a vehicle and an object present around the vehicle;
- an operation determination unit configured to determine whether an operation by a driver of the vehicle has been performed on an operation device to be used for driving the vehicle; and
- a recording unit configured to record information on driving of the vehicle when determination is made that the operation has not been performed continuously for a first period before a time point at which the distance between the vehicle and the object is equal to or smaller than a predetermined value and determination is made that the operation has been performed within a second period after the time point.

(2) In the vehicle information recording device according to (1), the information on the driving of the vehicle may be image information obtained by imaging surroundings of the vehicle or position information of the vehicle.

(3) In the vehicle information recording device according to (1), the information on the driving of the vehicle may be information indicating a driving condition of the vehicle.

The present disclosure provides the vehicle information recording device capable of recording a situation in which a driver of a vehicle feels some danger except for a situation intended by the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a schematic diagram illustrating functional blocks of a processor of an ECU;

FIG. 4 is a flow chart illustrating a process performed by the processor of ECU at predetermined control cycles;

FIG. 5 is a flow chart showing a process performed by the processor of ECU at every predetermined control cycle.

DETAILED DESCRIPTION OF EMBODIMENTS

Hereinafter, some embodiments of the present disclosure will be described with reference to the drawings. However, these descriptions are intended to be merely exemplary of the preferred embodiments of the present disclosure and are not intended to limit the present disclosure to such specific embodiments.

Figure 1:
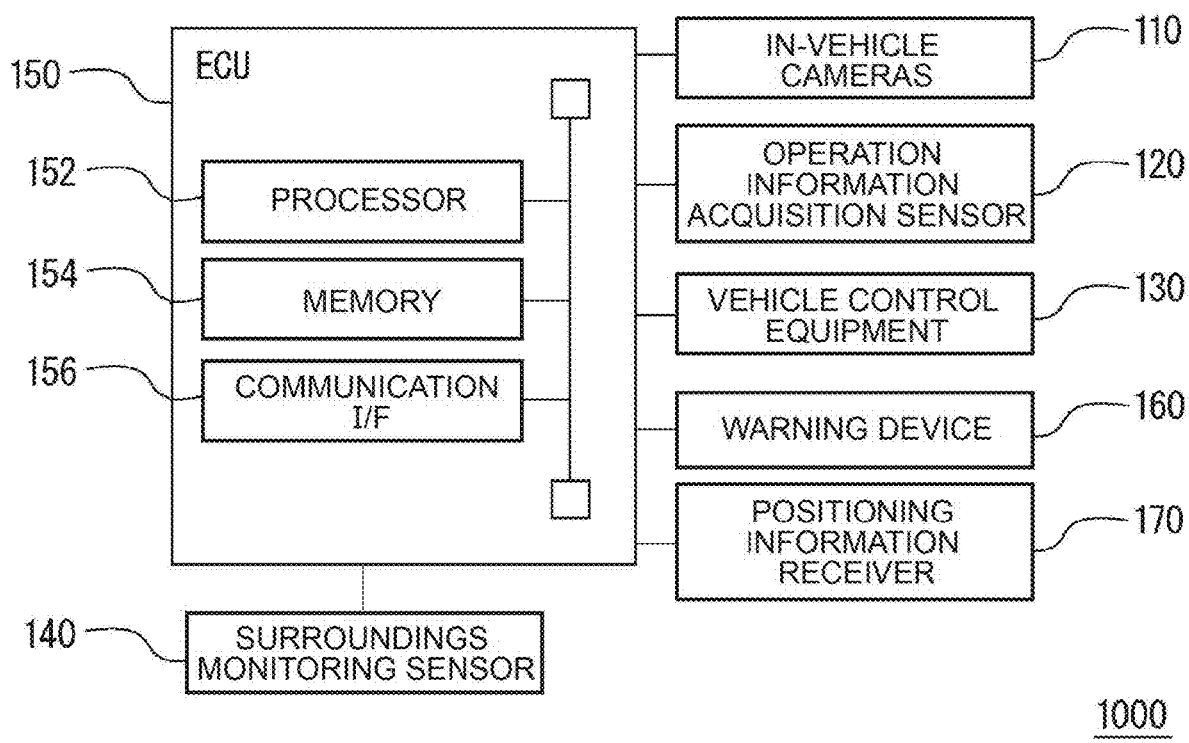
FIG. 1 is a schematic configuration diagram of a control system of a vehicle according to one embodiment.

FIG. 1 is a schematic configuration diagram of a vehicle control system 1000 according to one embodiment. The control system 1000 is mounted on a vehicle such as an automobile, and includes an in-vehicle camera 110, an operation information acquisition sensor 120, a vehicle control device 130, a surroundings monitoring sensor 140, an Electronic Control Unit (ECU) (hereinafter, referred to as a ECU) 150, a warning device 160, and a positioning information receiver 170. Each of the in-vehicle camera 110, the operation information acquisition sensor 120, the vehicle control device 130, the surroundings monitoring sensor 140, ECU 150, the warning device 160, and the positioning information receiver 170 is communicably connected via an in-vehicle network compliant with a standard such as Controller Area Network (CAN).

The in-vehicle camera 110 includes a two-dimensional detector configured by arrays of photoelectric transducers sensitive to visible light, such as CCD or C-MOS, and an imaging optical system that forms an image of an area to be imaged on the two-dimensional detector. The in-vehicle camera 110 is provided in a dashboard inside the vehicle, in the vicinity of a windshield, or the like, and photographs the surroundings of the vehicle (for example, in front of the vehicle) to generate an image representing the environment around the vehicle. The in-vehicle camera 110 performs shooting every predetermined shooting cycle (for example, 1/30 second to 1/10 second). The in-vehicle camera 110 may be constituted by a stereo camera, or may be constituted so as to acquire a distance from the parallax of the left and right images to each structure on the image. Each time an image is generated, the in-vehicle camera 110 outputs the generated image to ECU 150 via the in-vehicle network.

The operation information acquisition sensor 120 is a sensor for acquiring operation information of an operation device for driving the vehicle by a driver of the vehicle. Examples of the operating device for driving the vehicle include an accelerator pedal, a brake pedal, a steering wheel, and a shift lever. The operation information acquisition sensor 120 includes an accelerator sensor that acquires operation information of an accelerator pedal, a brake sensor that acquires operation information of a brake pedal, a steering sensor that acquires operation information of steering, and a shift position sensor that acquires operation information (shift position) of a shift lever. The steering sensor is, for example, an Electric Power Steering System (EPS) torque sensor, and detects an operation torque by a driver as operation data of the steering. The operation on the operation device is not limited to the operation during the manual driving, and may be the operation during the autonomous driving. In the case of an operation during autonomous driving, switching from autonomous driving to manual driving may be performed.

The vehicle control device 130 is various devices related to vehicle control, and includes a driving device such as an internal combustion engine or an electric motor as a driving source for driving the vehicle, a transmission, a braking device for braking the vehicle, a steering device for turning the vehicle, and the like. When the driving source for driving the vehicle is an electric motor, the vehicle control device 130 may include a battery for storing electric power, a fuel cell for supplying electric power to the electric motor, and the like. When the vehicle is battery electric vehicle (EV), the vehicle control device 130 may not include the internal combustion engine. When the vehicle is an engine vehicle, the vehicle control device 130 may not include an electric motor.

The surroundings monitoring sensor 140 is a sensor for monitoring the surroundings of the vehicle. The surroundings monitoring sensor 140 includes, for example, a sensor such as a Light Detection and Ranging (Lidar) or a radar (Radar). The radar includes a front side radar sensor on the inside of the front bumper and a rear side radar sensor on the inside of the rear bumper.

ECU 150 is an aspect of an information recording device for a vehicle. ECU 150 includes a processor 152, memories 154, and a communication interface 156. The processor 152 has one or more Central Processing Unit (CPU) and its peripheral circuitry. The processor 152 may further include other arithmetic circuits, such as a logical operation unit, a numerical operation unit, or a graphics processing unit. The memory 154 includes, for example, a volatile semiconductor memory and a non-volatile semiconductor memory, and stores data related to the processing according to the present embodiment. The communication interface 156 has interface circuitry for connecting ECU 150 to the in-vehicle networking.

The warning device 160 includes a display device and a speaker. The display device includes, for example, a liquid crystal display (LCD), is provided in the vicinity of an instrument cluster, a dashboard, or the like, and displays and outputs an alert in response to an instruction from an ECU 150. In response to an instruction from ECU 150, the speaker outputs an alert by sound.

The positioning information receiver 170 acquires positioning information indicating a current position and an attitude of the vehicle. For example, the positioning information receiver 170 may be a Global Positioning System (GPS) receiver.

Figure 2:
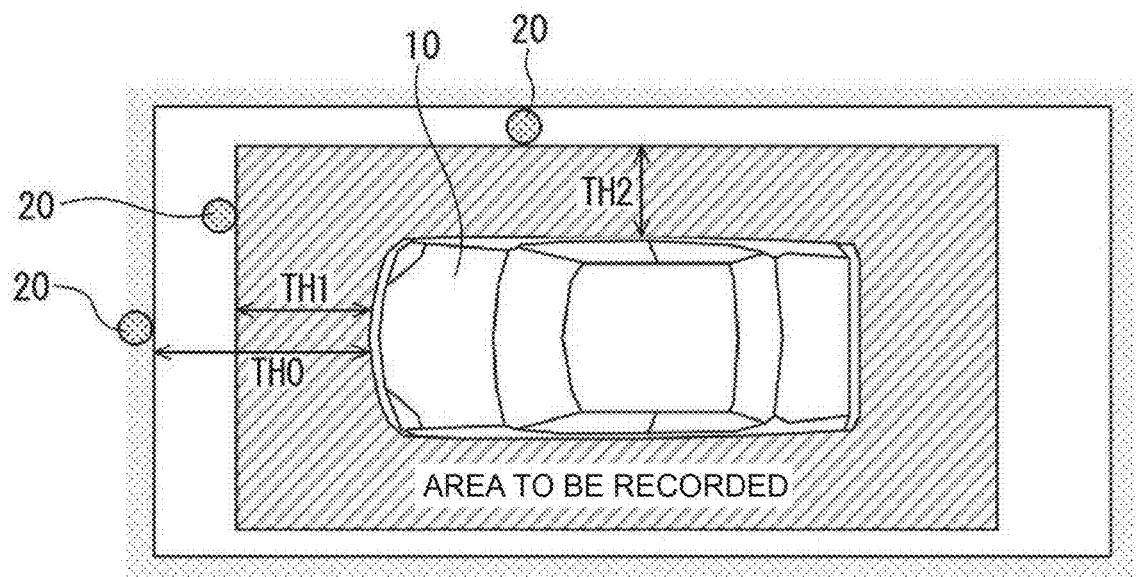
FIG. 2 is a plan view of the vehicle from above, showing a threshold of distance for determining other objects present in the vicinity of the vehicle.

FIG. 2 is a plan view of the vehicle 10 as viewed from above, and is a view showing a threshold of a distance for determining an object 20 existing in the periphery of the vehicle 10. For example, as shown in FIG. 2, when an object 20 (another vehicle, a person, or the like) in front of the vehicle 10 approaches the vehicle 10 to a threshold TH0 of a distance, the advanced safety system is activated, and a warning or an automated brake by the collision damage reduction brake is activated. It is conceivable to record data when the advanced safety system is activated in order to record the situation in which the driver is in close contact.

On the other hand, even when the object 20 in the vicinity of the vehicle 10 approaches the threshold TH0, the advanced safety system may not operate. For example, when the vehicle speed exceeds a predetermined value, the collision damage reduction brake may be set in advance so as not to operate from the viewpoint of safety. In this case, even in a case where the driver of the vehicle 10 is in the near-miss state due to the approach to the object 20, data may not be recorded because the advanced safety system does not operate.

It is also beneficial to record and analyze information in situations where the driver is near, even if the advanced safety system is not operating or an accident is not actually occurring. In addition, the United Nations laws and regulations have been studying laws and regulations that require the reporting of incidents when they are monitored.

As described above, when the recording is performed based on the approach between the vehicle 10 and the object 20, the recording is performed even in a situation intended by the driver, that is, in a situation where the driver has understood, and unnecessary data is recorded. A situation intended by the driver is, for example, a case where the driver approaches an adjacent parking vehicle or a wall or the like when parking in a parking lot, or a case where the driver approaches a blocking rod when passing through a gate of an expressway. Further, as a situation intended by the driver, there is a case where a person or an object approaches the vehicle 10 when the vehicle 10 is driven at a low speed and stopped at the time of riding a person or loading an object.

In the present embodiment, a situation in which the driver is in the near-miss state is recorded, except in a situation where the advanced safety system is not in operation and a situation in which the driver is in the intended situation. As an example, the range of the distance to the object 20 to be recorded in the present embodiment is, for example, the range of the threshold TH1 before and after the vehicle hatched in FIG. 2 and the range of the threshold TH2 on the side of the vehicle, and is a range narrower than the range in which the advanced safety system operates. In the present embodiment, in a case where the object 20 approaches within the range hatched in FIG. 2, information on the situation that the driver is in the near-miss state is recorded except in a case where the situation is intended by the driver. The recorded information is information related to the driving of the vehicle in a situation where the driver is in the near-miss. For example, the recorded information may be an image representing an environment around the vehicle generated by the in-vehicle camera 110 in a situation where the driver is in close proximity. Further, the recorded information may be information indicating the driving state of the vehicle (information regarding the vehicle speed, the acceleration/deceleration of the vehicle, the accelerator operation amount, the brake depression amount, the steering position, the shift position, the rotational speed of the internal combustion engine or the motor, the coolant temperature, and the like, and the operation of the advanced safety system) in a situation where the driver is in close proximity. In addition, the information to be recorded may be position information of the vehicle in a situation where the driver is near. It should be noted that, even in a situation where the advanced safety system is operated, information related to the driving of the vehicle is recorded.

FIG. 3 is a schematic diagram illustrating functional blocks of the processor 152 of ECU 150 for realizing the above-described processes. The processor 152 of ECU 150 includes a distance determination unit 152a, an operation determination unit 152b, a recording unit 152c, and a driving assistance unit 152d. These units included in the processor 152 are, for example, functional modules realized by a computer program running on the processor 152. That is, the functional blocks of the processor 152 are composed of the processor 152 and a program (software) for causing the processor to function. The program may be recorded in the memory 154 of ECU 150 or a recording medium connected from the outside. Alternatively, each of these units included in the processor 152 may be a dedicated arithmetic circuit provided in the processor 152.

The distance determination unit 152a of the processor 152 determines a distance between the vehicle and an object existing in the vicinity of the vehicle on the basis of images representing the environment around the vehicle generated by the in-vehicle camera 110 and information detected by the surroundings monitoring sensor 140. At this time, the object is detected from the image by, for example, template matching between the template image and the image generated by the in-vehicle camera 110, and the distance from the parallax of the left and right images to the object on the image is acquired. By inputting an image generated by the in-vehicle camera 110 to an inspection object or, for example, a discriminator subjected to machine learning, an object is detected from the image, and the distance from the parallax of the left and right images to the object on the image is acquired.

The distance determination unit 152a may use, as the discriminator, for example, a discriminator for segmentation learned in advance so that, for each pixel of the image from the input image, the probability that the object is represented in the pixel is outputted for each type of object that may be represented in the pixel, and the object whose probability is maximized is identified as being represented. The distance determination unit 152a may use, as such an identifier, a deep neural network (DNN) having a convolutional neural network type (CNN) architecture for segmentation, such as Fully Convolutional Network (FCN), for example.

The operation determination unit 152b of the processor 152 determines, based on the information detected by the operation information acquisition sensor 120, whether or not an operation by a driver of the vehicle has been performed on an operation device for driving the vehicle.

The recording unit 152c of the processor 152 records information related to the driving of the vehicle in the memory 154 when the operation determination unit 152b determines that the operation has not been performed continuously for the first time period before the time point when the distance between the vehicle and the object becomes equal to or smaller than the predetermined value, and determines that the operation has been performed during the second time period after the time point. The recorded information related to the driving of the vehicle can be used for analysis of the driving state of the vehicle, the operation of the driver, and the like. The recorded information related to the driving of the vehicle may be transmitted to the outside of the vehicle.

The driving assistance unit 152d of the processor 152 supports driving of the drivers by the advanced safety system. The driving assistance unit 152d controls the vehicle control device 130 and controls the warning device 160 in order to assist the driving of the driver based on the images representing the surroundings of the vehicle generated by the in-vehicle camera 110 and the information detected by the surroundings monitoring sensor 140.

The driving assistance unit 152d performs the driving assistance by the collision mitigation braking when the distance between the vehicle and the object surrounding the vehicle reaches a predetermined threshold. For example, when detecting an object such as another vehicle or a person in front of the vehicle on the basis of the images generated by the in-vehicle camera 110 or the information detected by the surroundings monitoring sensor 140 and determining that there is a possibility of a collision with the object, the driving assistance unit 152d causes the warning device 160 to output a warning and causes the braking device to operate the automatic braking. In this case, when the distance from the vehicle to the object becomes equal to or smaller than the threshold TH0 shown in FIG. 2, the driving assistance unit 152d outputs a warning and activates the auto-braking.

FIG. 4 and FIG. 5 are flow charts showing processes performed by the processor 152 of ECU 150 at predetermined control cycles. FIG. 4 is a flowchart for setting a driver operation monitoring flag by object detection, and FIG. 5 is a flowchart for determining a driver operation after object detection.

First, in S10 of FIG. 4, a distance to an object around the vehicle is acquired. Next, it is determined whether or not the collision damage mitigation brake is activated (S12), and when the collision damage mitigation brake is not activated, the distance determination unit 152a determines whether or not the condition that the distance between the vehicle and the object ahead is less than the threshold TH1 has transitioned from non-satisfied to satisfied (S14). The threshold TH1 is, for example, 1 [m]. On the other hand, when it is determined in S12 that the collision-damage reduction braking is activated, the process in this control cycle ends.

When the condition that the distance from the front object is less than the threshold TH1 is not satisfied to not transition to satisfied in S14, the distance determination unit 152a determines whether or not the condition that the distance between the vehicle and the side object is less than the threshold TH2 has transitioned from not satisfied to satisfied (S16). The threshold TH2 is, for example, 0.5 [m]. If S16 does not indicate that the distance from the lateral object is less than the threshold TH2, the process in this control cycle ends.

If the condition that the distance to the front object is less than the threshold TH1 in S14 transitions from non-satisfied to satisfied, or if the condition that the distance to the side object is less than the threshold TH2 in S16 transitions from non-satisfied to satisfied, the operation determination unit 152b determines whether or not the driver operation has been performed during the latest T1 period (S18). When S18 is not satisfied, that is, when there is no driver operation continuously during T1 period, the driver operation monitoring flag is set to ON (S20). On the other hand, if there is a driver operation during T1 period, the process in this control cycle ends without setting the driver operation monitoring flag to ON.

In the flow chart of FIG. 5, first, it is determined whether or not the driver-operation monitoring flag is OFF (S30). Then, when the driver operation monitoring flag is not off (OFF), that is, when the driver operation monitoring flag is on (ON), it is determined whether or not T2 period has elapsed since the driver operation monitoring flag is turned on (ON) (S32). When T2 period has not elapsed since the driver operation monitoring flag is turned ON, the operation determination unit 152*b* determines whether or not the driver operation has been performed during T2 period (S34).

In S34, when the driver is operated during T2 period, a recording trigger is established, and the recording unit 152*c* records information related to the driving of the vehicle in the memory 154 (S36). After S36, the driver-operation monitoring flag is set to OFF (S38), and after S38, the process in this control cycle ends. If the driver operation monitoring flag is off (OFF) in S30, or if T2 period has elapsed since the driver operation monitoring flag was turned on (ON) in S32, the process in this control cycle ends.

Figure 6:
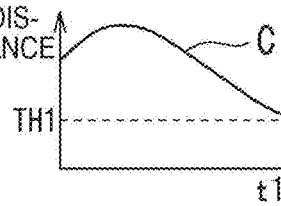
FIG. 6 is a diagram for explaining whether or not a recording trigger is established according to an operation pattern of a driver by the processing of FIGS. 4 and 5.

FIG. 6 is a diagram for explaining whether or not a recording trigger is established according to an operation pattern of a driver by the processing of FIGS. 4 and 5. In FIG. 6, a state (characteristic C) in which the distance between the vehicle and the object in front of the vehicle changes with time and the object approaches the vehicle is shown in the uppermost stage. Patterns I to V shown in FIG. 6 are operation patterns of the driver when the object approaches the vehicle according to the characteristic C. In the right column of FIG. 6, it is shown whether or not the recording trigger is established in S34 of FIG. 5 for each of the patterns I to V.

As shown in the characteristic C of FIG. 6, the object in front of the vehicle approaches with the passage of time, and the distance between the vehicle and the object reaches the threshold TH1 at the time t1. In the pattern I, there is no operation of the driver continuously within the time period of T1 prior to the time t1, and there is an operation of the driver within the time period T2 after the time t1. In this situation, there is a possibility that the driver has operated after the time t1 as a near-miss due to the object approaching the vehicle. In the case of the pattern I, since the determination of S18 in FIG. 4 is NO and the determination of S34 in FIG. 5 is YES, the recording trigger is established in S36.

In the pattern II, the operation of the driver is performed before the time t1, but the operation of the driver is not performed continuously for T1 period. Then, the drivers are operated within T2 times after the time t1. In this situation, there is a possibility that the driver is operated as a near-miss before the time t1 due to the object approaching the vehicle. Even in the pattern II, since the determination of S18 in FIG. 4 is NO and the determination of S34 in FIG. 5 is YES, the recording trigger is established in S36.

In the pattern III, since there is no driver manipulation before and after the time t1, the driver recognizes that the object in front of the vehicle is approaching, and it is highly likely that the situation is intended by the driver, for example, during autonomous driving. In the pattern III, since the determination of S18 in FIG. 4 is NO and the determination of S34 in FIG. 5 is NO, S36 recording trigger is not established.

In the pattern IV, the operation of the driver is continuously performed during t1 of T1 period before the time t1, and the operation of the driver is also performed within T2 period after the time. In this case, since the operation is performed before the time t1, the driver intentionally performs the operation after recognizing that the object in front of the vehicle is approaching, and it is highly likely that the operation is intended by the driver. In the pattern IV, since the determination of S18 in FIG. 4 is YES and the driver-operation monitoring flag is not turned ON, the recording trigger of S36 in FIG. 5 is not established.

In the pattern V, the operation of the driver is continuously performed within T1 period before the time t1, and the operation of the driver is continuously performed even after the time t1. In this situation, the driver intentionally operates from before the time t1 to after the time t1, and it is highly likely that the situation is the situation intended by the driver. Also in the pattern V, since the determination of S18 in FIG. 4 is YES and the driver-operation monitoring flag is not turned ON, the recording trigger of S36 in FIG. 5 is not established.

As described above, according to the present embodiment, when the advanced safety system does not operate, information related to the driving of the vehicle in a situation where the driver is in the near-miss state is recorded except for a situation intended by the driver. Therefore, unnecessary information is not recorded in the situation intended by the driver, and the amount of information to be recorded can be reduced. As a result, the capacity of the recording medium such as the memory 154 for recording information can be reduced, and the communication amount at the time of transmitting and receiving information can also be reduced. In addition, since the hardware of the existing system 1000 can be used without adding new components, the installation cost is reduced.

What is claimed is:

1. A vehicle information recording system comprising:
   a camera mounted on a vehicle that is moving and configured to capture images around the vehicle;
   a sensor configured to measure distance between the vehicle and an object present around the vehicle;
   a vehicle sensor configured to acquire an operation of the vehicle by a driver;
   a memory; and
   a processor configured to
   acquire information indicating a distance between the vehicle and the object from the sensor,
   determine whether the distance between the vehicle and the object is equal to or less than a threshold based on the acquired information,
   in a case where the distance between the vehicle and the object is equal to or less than the threshold, determine whether, before the distance between the vehicle and the object becomes equal to or less than the threshold, a driver has continuously performed the operation of the vehicle for a first predetermined time period,
   in a case where the driver has not continuously performed the operation of the vehicle for the first predetermined time period, determine whether, after the distance between the vehicle and the object is equal to or less than the threshold and within a second predetermined time period, the driver has performed the operation of the vehicle,
   in a case where the driver has performed the operation of the vehicle within the second predetermined time period, acquire image data from the camera and record the image data in the memory,
   in a case where the driver has performed the operation of the vehicle for the first predetermined time period, not acquire image data from the camera, wherein the first predetermined time period and the second predetermined time period are consecutive, and the operation of the vehicle by the driver includes an operation of an accelerator pedal, a brake pedal, a steering, or a shift lever.

2. The vehicle information recording system according to claim 1, wherein
the operation of the vehicle by the driver is the operation of the accelerator pedal.

3. The vehicle information recording system according to claim 1, wherein
the operation of the vehicle by the driver is the operation of the brake pedal.

4. The vehicle information recording system according to claim 1, wherein
the operation of the vehicle by the driver is the operation of the steering.

5. The vehicle information recording system according to claim 1, wherein
the operation of the vehicle by the driver is the operation of the shift lever.

6. The vehicle information recording system according to claim 1, wherein
the operation of the vehicle by the driver is the operation of the accelerator pedal, and
the processor is further configured to, in a case where the driver has operated the vehicle within the second predetermined time period, acquire information indicating an accelerator operation amount from the vehicle sensor and record the information in the memory.

7. The vehicle information recording system according to claim 1, wherein
the operation of the vehicle by the driver is the operation of the brake pedal, and
the processor is further configured to, in a case where the driver has operated the vehicle within the second predetermined time period, acquire information indicating a brake depression amount from the vehicle sensor and record the information in the memory.

8. The vehicle information recording system according to claim 1, wherein
the operation of the vehicle by the driver is the operation of the steering, and
the processor is further configured to, in a case where the driver has operated the vehicle within the second predetermined time period, acquire information indicating steering position from the vehicle sensor, and record the information in the memory.

9. The vehicle information recording system according to claim 1, wherein
the operation of the vehicle by the driver is the operation of the shift lever, and
the processor is further configured to, in a case where the driver has operated the vehicle within the second predetermined time period, acquire information indicating shift position from the vehicle sensor, and record the information in the memory.

10. The vehicle information recording system according to claim 1, wherein
the processor is further configured to, in a case where the driver has operated the vehicle within the second predetermined time period, acquire information indicating an operation of an advanced safety system from the vehicle sensor, and record the information in the memory.

11. The vehicle information recording system according to claim 2, wherein the processor is configured to determine whether the distance between the vehicle and an object in front of the vehicle is equal to or less than a first threshold,
determine whether the distance between the vehicle and an object on either left or right side of the vehicle is equal to or less than a second threshold that is smaller than the first threshold, and
in a case where the distance between the vehicle and the object in front of the vehicle is equal to or less than the first threshold, or the distance between the vehicle and the object on either left or right side of the vehicle is equal to or less than the second threshold, determine that the distance between the vehicle and the object is equal to or less than the threshold.

12. The vehicle information recording system according to claim 3, wherein the processor is configured to
determine whether the distance between the vehicle and an object in front of the vehicle is equal to or less than a first threshold,
determine whether the distance between the vehicle and an object on either left or right side of the vehicle is equal to or less than a second threshold that is smaller than the first threshold, and
in a case where the distance between the vehicle and the object in front of the vehicle is equal to or less than the first threshold, or the distance between the vehicle and the object on either left or right side of the vehicle is equal to or less than the second threshold, determine that the distance between the vehicle and the object is equal to or less than the threshold.

13. The vehicle information recording system according to claim 4, wherein the processor is configured to
determine whether the distance between the vehicle and an object in front of the vehicle is equal to or less than a first threshold,
determine whether the distance between the vehicle and an object on either left or right side of the vehicle is equal to or less than a second threshold that is smaller than the first threshold, and
in a case where the distance between the vehicle and the object in front of the vehicle is equal to or less than the first threshold, or the distance between the vehicle and the object on either left or right side of the vehicle is equal to or less than the second threshold, determine that the distance between the vehicle and the object is equal to or less than the threshold.

14. The vehicle information recording system according to claim 5, wherein the processor is configured to
determine whether the distance between the vehicle and an object in front of the vehicle is equal to or less than a first threshold,
determine whether the distance between the vehicle and an object on either left or right side of the vehicle is equal to or less than a second threshold that is smaller than the first threshold, and
in a case where the distance between the vehicle and the object in front of the vehicle is equal to or less than the first threshold, or the distance between the vehicle and the object on either left or right side of the vehicle is equal to or less than the second threshold, determine that the distance between the vehicle and the object is equal to or less than the threshold.

15. The vehicle information recording system according to claim 14, wherein the first threshold is 1 m and the second threshold is 0.5 m.

16. The vehicle information recording system according to claim 14, wherein the sensor includes a Light Detection and Ranging.

\* \* \* \* \*